United States Patent [19]

Luginbuhl et al.

[11] Patent Number: 4,509,200

[45] Date of Patent: Apr. 2, 1985

[54] SATELLITE TELECOMMUNICATIONS SYSTEM

[75] Inventors: Pierre Luginbuhl; Alain Parnière; Lazare Argintaru, all of Paris, France

[73] Assignee: Thomson-CSF, Paris, France

[21] Appl. No.: 478,107

[22] Filed: Mar. 23, 1983

[30] Foreign Application Priority Data

Mar. 26, 1982 [FR] France ............................... 82 05246

[51] Int. Cl.³ .......................................... H04B 7/185
[52] U.S. Cl. .......................................... 455/12; 455/51; 455/52; 455/86
[58] Field of Search ...................... 455/12, 23, 51, 52, 455/76, 86; 375/3; 370/104

[56] References Cited

U.S. PATENT DOCUMENTS

| 3,428,898 | 2/1969 | Jacobsen et al. | 455/12 |
| 4,019,138 | 4/1977 | Watanabe et al. | 455/12 |
| 4,191,923 | 3/1980 | Schelisch | 455/12 |
| 4,232,389 | 11/1980 | Loiler | 455/12 |
| 4,361,886 | 11/1982 | Gutleber | 455/12 |

OTHER PUBLICATIONS

Conference Proceedings, 6th European Microwave Conference, Tuesday 14 to Friday 17, Sep. 1976, Rome Microwave Exhibitions and Publishers Ltd. Sevenoaks, Kent (GB), B. G. Evans et al.: "Single Channel Per Carrier Satellite Communications Systems", pp. 480–486.

*Primary Examiner*—Jin F. Ng
*Attorney, Agent, or Firm*—Oblon, Fisher, Spivak, McClelland & Maier

[57] ABSTRACT

A satellite telecommunications system having peripheral stations and a central station which communicate with each other via a satellite. The central station transmits a reference frequency to the peripheral stations via the satellite. The central station receives the reference frequency, determines the frequency drift and transmits a controlling signal to the satellite. The reference frequency transmitted by the satellite is controlled by the controlling signal so as to be stable in time.

4 Claims, 3 Drawing Figures

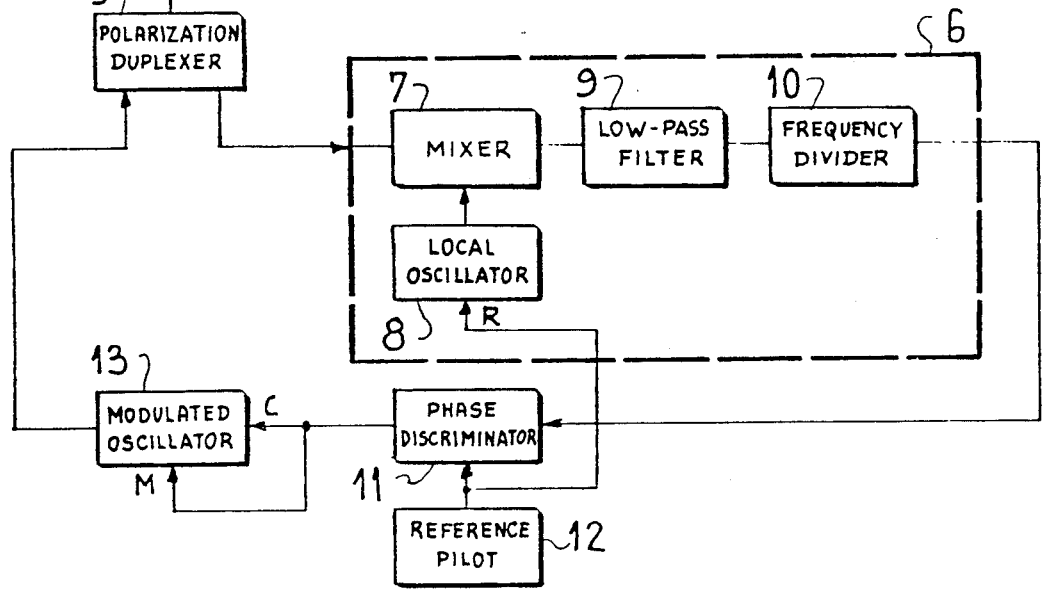
FIG_2
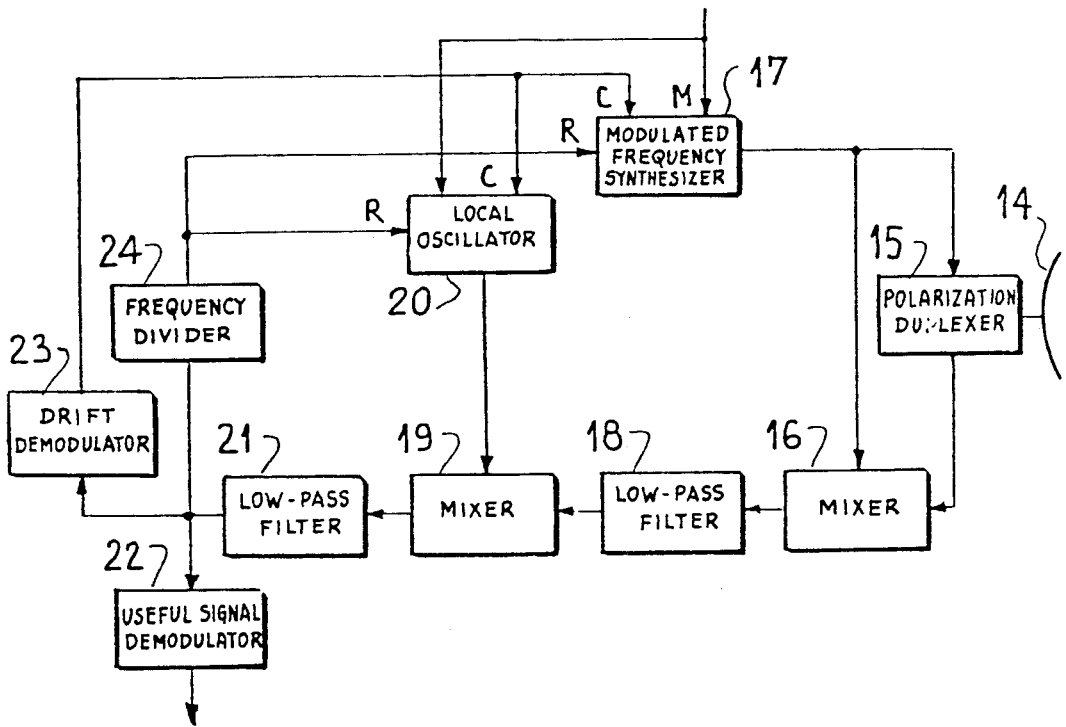
FIG_3

SATELLITE TELECOMMUNICATIONS SYSTEM

BACKGROUND OF THE INVENTION

The present invention relates to a satellite telecommunications system. In such a system a group of ground stations interchange information by means of a satellite. Each of these stations transmits information by modulation of a carrier frequency belonging to the particular station. When a first station wishes to listen to a second station, it is necessary to previously position the reception equipment of the first station on the appropriate carrier frequency. This carrier frequency is determined by adding to the carrier frequency on which the second station transmits, the frequency shift due to the passage via the satellite of the wave transmitted by the second station. This frequency shift is made necessary by the fact that a satellite, incorporating active components, cannot receive and retransmit on the same frequency.

As it is very difficult to have a stable reference frequency within a satellite, compared with a theoretical value, there is a certain inaccuracy with respect to this frequency shift, which is called drift. The drift also varies in time, particularly as a function of the orientation conditions of the satellite in space.

To ensure good reception of information transmitted by the different stations, it is necessary to ensure that the reception equipment of each station is able at all times to tune to the real frequency and not the theoretical frequency of the retransmission by the satellite of the various carriers, i.e. it must be aware of the satellite drift at all times.

For this purpose it is known to provide the reception equipment of the various stations with an automatic frequency control system (AFC system). However, the automatic frequency control cannot be used in satellite telecommunications systems such as the single channel per carrier or SCPC system, where the carrier is not transmitted continuously, but only when there is information to be transmitted.

In such systems, it is known to use a special station, called a central station, which has a perfectly stable oscillator, called the reference pilot, which transmits a reference frequency received by all the other stations, called peripheral stations. The latter are also provided with perfectly stable oscillators and are consequently at all times able to measure the satellite drift and therefore can be automatically tuned to the real retransmission frequency by the satellite of the different carriers.

However, such telecommunications systems have the disadvantage of requiring several perfectly stable oscillators in all the stations and are therefore expensive.

SUMMARY OF THE INVENTION

The present invention therefore relates to a satellite telecommunications system only requiring a single perfectly stable oscillator located in the central station, as a result of a simple modification to the transmission and reception equipment of the central and peripheral stations.

The present invention therefore relates to a satellite telecommunications system comprising a central station and n peripheral stations communicating with one another, via a satellite, by the modulation of carrier waves, each peripheral station having an allocated frequency $F_i$ of carrier wave, $i=1$ to n and in which the central station transmits via the satellite, a reference signal having a frequency $F_o$ to the peripheral stations, the satellite operating an algebraic addition of the received frequency $F_o$ and of a frequency shift $\Delta F$ and imparting also a frequency drift $\delta F$ variable in time and wherein the central station comprises means for making the frequency $F_o$ of the reference dependent on a signal which is proportional to $\delta F$, the corresponding frequency retransmitted by the satellite being stable in time.

BRIEF DESCRIPTION OF THE DRAWINGS

The invention is described in greater detail hereinafter relative to non-limitative embodiments and the attached drawings, wherein show:

FIG. 2 a diagram of the central station of a satellite telecommunications system according to the invention.

FIG. 3 a diagram of the peripheral stations of a satellite telecommunications system according to the invention.

DESCRIPTION OF A PREFERRED EMBODIMENT

Figure 1:
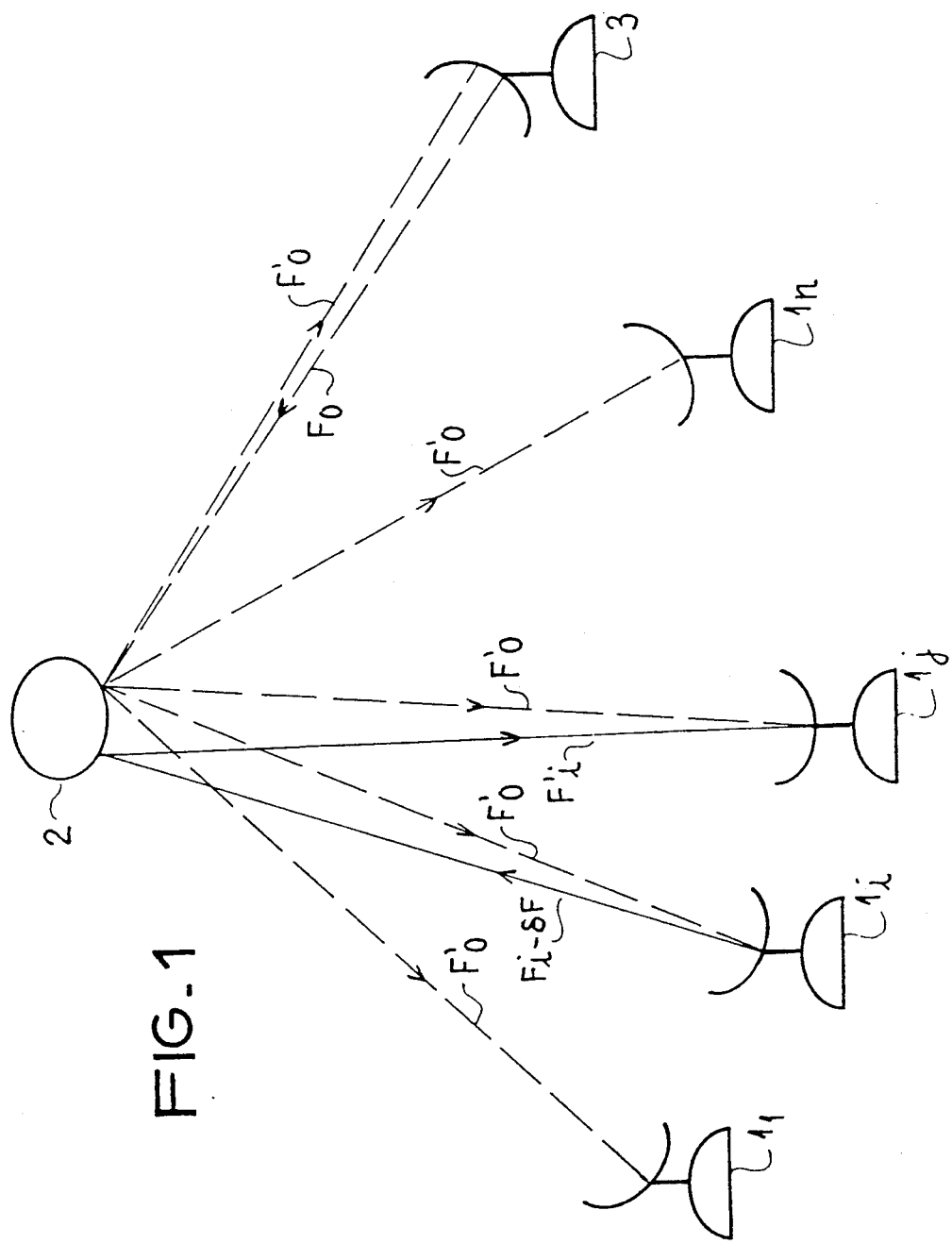
FIG. 1 diagrammatically a satellite telecommunications system according to the invention.

The satellite telecommunications system shown very diagrammatically in FIG. 1 comprises n peripheral stations $1_1$ and $1_n$, which communicate with one another via a satellite 2.

Each peripheral station $1_i$ (with i varying from 1 to n) transmits information to satellite 2 by the modulation of a frequency carrier $F_i$ and the satellite retransmits this information to the group of stations on a carrier frequency $F'_i + \delta F$, in which $F'_i - F_i$ represents the frequency shift $\Delta F$ provided by satellite 2 and in which $\delta F$ represents the instantaneous drift of the satellite.

Those peripheral stations which wish to listen to station $1_i$ must previously adjust their reception equipment to the frequency $F'_i + \delta F$ and for this purpose must know the instantaneous drift $\delta F$ of the satellite (the frequency shift $\Delta F$ being a fixed value defining the satellite). To this end a central station 3 is provided, which is equipped with a perfectly stable reference pilot. Central station 3 transmits a reference frequency $F_o$, which is retransmitted by satellite 2, with a frequency shift $\Delta F$ and an instantaneous drift $\delta F$, to the group of stations and in particular central station 3.

According to the invention, central station 3 has means for making the reference frequency $F_o$ dependent on a value such that the corresponding frequency $F'_o$ retransmitted by the satellite is perfectly stable in time, i.e. does not suffer from drift. Contrary to what happened in the prior art, it is not reference frequency $F_o$ transmitted by the central station 3 which is perfectly stable in time, but the corresponding frequency $F'_o$ retransmitted by the satellite. The peripheral stations receive a frequency $F'_o$ which is perfectly stable in time from the satellite, so that it is no longer necessary to equip them with perfectly stable oscillators.

However, the mere reception of frequency $F'_o$ by the peripheral stations is not sufficient to provide them with the information of the instantaneous drift $\delta F$ of the satellite. Hence, according to the invention, the central station 3 also has means for evaluating the instantaneous drift $\delta F$ of the satellite and for modulating the carrier $F_o$ transmitted by the central station 3 with information $\delta F$. Correlatively, the peripheral stations $1_1$ and $1_n$ have means for demodulating the information $\delta F$ received on carrier $F'_o$ retransmitted by satellite 2 in response to the received carrier $F_o$.

During the passage via the satellite 2 of carrier $F_i$ transmitted by the peripheral station $1_i$, an instantaneous drift $\delta F$ is algebraically added to the corresponding theoretical frequency $F'_i$ (equal to $F_i + \Delta F$) transmitted on return by the satellite 2.

According to the invention, each peripheral station $1_i$ also has means for algebraically subtracting, prior to transmission, the instantaneous drift $\delta F$ demodulated at the carrier frequency $F_i$ allocated to the station. Thus, after passing via satellite 2, the other peripheral stations receive the information transmitted by the latter on the theoretical carrier $F'_i$, which does not suffer from drift.

In FIG. 1, the paths taken by the waves transmitted by central station 3 to the group of peripheral stations $1_1$ to $1_n$ and the central station 3 are represented by dotted lines. The continuous lines represent the path taken by the waves transmitted by a peripheral station e.g. $1_i$ to another peripheral station $1_j$. The carrier frequency used is mentioned on each of these paths.

FIG. 2 diagrammatically shows an embodiment of the central station. The latter comprises an antenna 4 which, via a polarization duplexer 5, receives the signal to be transmitted to the satellite and supplies the signal received from the satellite.

The central station also has a frequency conversion stage 6 for converting the frequency received from the satellite (approximately a few gigahertz) into a lower frequency band (e.g. a few megahertz).

The frequency conversion stage 6 comprises a mixer 7, which receives on the one hand the signal received by polarization duplexer 5, and on the other signals supplied by a local oscillator 8. The frequency conversion stage 6 also has a low-pass filter 9, which receives the output signal from mixer 7 and a frequency divider 10, which receives the output signal from low-pass filter 9. The output of frequency divider 10 constitutes the output of the frequency conversion stage 6.

The central station also has a phase discriminator 11 receiving on the one hand the output signal from the frequency conversion stage 6 and on the other the signal supplied by a reference pilot 12.

Finally, the central station has a modulated oscillator 13, provided with a control input C and a modulation input M, connected to the output of phase discriminator 11. The modulated oscillator 13 supplies the signal to be transmitted to the satellite to polarization duplexer 5. The local oscillator 8 is provided with a reference input R connected to the output of the reference pilot 12.

In order to define the notions of reference input and control input of an oscillator, it is pointed out that a local oscillator, or a synthesizer essentially comprises a phase locking loop having a comparator provided with a first input receiving a reference frequency, a voltage-controlled oscillator provided with an input connected to the comparator output and a variable rank divider provided with an input connected to the voltage-controlled oscillator output, an output connected to a second comparator input and a regulating input. The control input of a local oscillator or a synthesizer is understood to mean the regulating input of the variable rank divider whilst the reference input is the first input of the comparator.

In the case of digital modulation, an analog-digital converter is positioned between the output of phase discriminator 11 and the modulation input of the modulated oscillator 13.

The central station of FIG. 2 operates in the following way.

$F_R$ is the frequency supplied by the reference pilot 12 and $F_T$ the frequency obtained at the output of the frequency conversion stage 6.

Frequency $F_R$ is perfectly stable in time. However, when there is no control of the frequency transmitted by central station 3, the frequency received by the latter from the satellite is not perfectly stable in time. The precision of frequency $F_T$ obtained at the output of the frequency conversion stage is that of the frequency received from the satellite, divided by the division rank of the frequency divider. Frequency $F_R$ is made equal to the frequency which would be obtained at the output of the frequency conversion stage 6, if the frequency present at the input of said stage was the perfectly stable frequency $F'_o$.

A signal representing the phase error between the signal actually received from the satellite and the reference clock is obtained at the output of phase discriminator 11, when the system is locked. This signal is applied to the control input of modulated oscillator 13, in order to maintain the frequency of the carrier transmitted by this oscillator in such a way that the carrier frequency retransmitted by the satellite is equal to the perfectly stable frequency $F'_o$, in which case the variation obtained at the output of phase discriminator 11 is of a minimum nature.

The signal obtained at the output of phase discriminator 11 represents the instantaneous drift $\delta F$ of the satellite. It is for this reason that it is used for modulating the carrier transmitted by oscillator 13, so as to inform the peripheral stations of this drift.

An embodiment of a peripheral station will now be described relative to FIG. 3. The peripheral station comprises an antenna 14 which, across a polarization duplexer 15, receives the signal to be transmitted to the satellite and supplies the signal received from the satellite.

The peripheral station also has a frequency conversion stage in which two frequency conversions are performed in succession. A first frequency conversion is performed by means of a mixer 16, which receives on the one hand the signal supplied by the polarization duplexer 15 and on the other the signal supplied by a modulated frequency synthesizer 17, which is also used for transmission, as will be shown hereinafter. Mixer 16 is followed by a low-pass filter 18. A second frequency conversion takes place by means of a mixer 19, which receives on the one hand the signal supplied by low-pass filter 18 and on the other the signal supplied by a local oscillator 20. Mixer 19 is followed by a low-pass filter 21.

The peripheral station also has a demodulator 22, called the useful signal demodulator, connected at the output of low-pass filter 21 and which serves to restore the useful information received from another peripheral station and transmitted by the modulation of the carrier frequency allocated to this station.

The peripheral station also has a demodulator 23, called the drift demodulator, connected to the output of low-pass filter 21 and which serves to restore the satellite drift information, transmitted by modulation of the carrier frequency supplied by the central station. The output signal of demodulator 23 is applied to the control input C of modulated synthesizer 17 and of local oscillator 20.

Moreover, the signal supplied by the low-pass filter 21 is applied, via a frequency divider 24, to reference input R of local oscillator 20 and of modulated synthesizer 17.

The useful information to be transmitted by the peripheral station is applied to the modulation input M of modulated synthesizer 17.

Moreover, as the modulated synthesizer 17 is also used as a local oscillator for the first frequency conversion, the useful information applied to the modulation input of synthesizer 17 is also applied to local oscillator 20 used for the second frequency conversion, so as to ensure an anti-local effect, i.e. it prevents the return of transmitted information.

The peripheral station shown in FIG. 3 functions in the following way. The perfectly stable carrier frequency $F'_o$ transmitted by the satellite in response to the carrier frequency transmitted by the central station and modulated with the satellite drift information, after frequency conversion, is applied to the reference input R of modulated synthesizer 17 and local oscillator 20. The frequencies generated in the peripheral station are consequently perfectly stable although said peripheral station has no reference pilot.

The satellite drift information obtained at the output of demodulator 23 is applied to the control input C of modulated synthesizer 17, where it is subtracted (in algebraic values) from the carrier frequency allocated to said peripheral station.

The same drift is then added (in algebraic values) to this carrier frequency during the passage via the satellite, so that the various peripheral stations receive the carrier frequency displaced by the satellite, but which does not suffer from drift.

It is therefore merely necessary to adjust the reception equipment of each peripheral station to the theoretical carrier frequencies retransmitted by the satellite to ensure a good reception of the information transmitted by the other peripheral stations.

In order to maintain the perfectly stable nature (compared with the frequency received from the satellite) of the frequencies generated in the peripheral station, it is necessary to algebraically add the instantaneous drift $\delta F$ to the frequency generated by local oscillator 20. It is for this reason that the drift information supplied by demodulator 23 is also applied to the control input C of local oscillator 20.

What is claimed is:

1. A satellite telecommunications system comprising a central station and n peripheral stations communicating with one another, via a satellite, by the modulation of carrier waves, each peripheral station having an allocated frequency $F_i$ of carrier wave, i=1 to n and in which the central station transmits to said satellite a signal $F_o$ which retransmits a reference signal having a frequency $F'_o$ to the peripheral stations, the satellite operating an algebraic addition of the received frequency $F_o$ and of a frequency shift $\Delta F$ and imparting also a frequency drift $\delta F$ variable in time, wherein the central station comprises means for controlling said frequency $F_o$ according to the frequency drift $\delta F$ so that said frequency $F'_o$ is stable in time, said means for controlling including a phase discriminator for evaluating the instantaneous frequency drift $\delta F$ of the satellite supplying said signal, and means for modulating the reference frequency $F_o$ with the thus evaluated instantaneous frequency drift $\delta F$, said means for modulating the reference frequency transmitted by the central station comprising an oscillator with controllable frequency having a control input connected to an output of said phase discriminator, said phase discriminator having two inputs which receives on one input a perfectly stable frequency supplied by a reference oscillator and on the second input the frequency $F'_o$ retransmitted by the satellite in response to the reference frequency $F_o$ transmitted by the central station and converted by means of a frequency conversion stage; and wherein each peripheral station comprises means for demodulating the instantaneous frequency drift $\delta F$ of the satellite and, before transmission, algebraically substracting the instantaneous frequency drift $\delta F$ of the satellite from the carrier frequency $F_i$ allocated to said peripheral station.

2. A system according to claim 1, wherein each peripheral station has a frequency synthesizer for emission and for reception, said synthesizer being connected to a peripheral station frequency conversion stage during reception, said synthesizer having a control input, wherein the means for demodulating the frequency drift and algebraically subtracting the instantaneous drift of the satellite from the carrier frequency $F_i$ allocated to the peripheral station prior to transmission comprise a drift demodulator having an input connected at the output of the frequency conversion stage and an output connected to the control input of the frequency synthesizer.

3. A system according to claim 2, wherein in each peripheral station, said frequency conversion stage operates two successive frequency conversion and in which the frequency synthesizer used on transmission is also used as a local oscillator for one of these conversions, and wherein said frequency conversion stage comprises a further oscillator having a control input, the output of said drift demodulator being also connected to said control input of said further oscillator.

4. A system according to claim 3, wherein the frequency synthesizer and the further local oscillator have reference inputs connected to the output of the frequency conversion stage of each peripheral station.

* * * * *